United States Patent [19]
Lee et al.

[11] Patent Number: 5,917,807
[45] Date of Patent: Jun. 29, 1999

[54] APPARATUS FOR AND METHOD OF CHECKING THE VALIDITY OF DIRECTORY NUMBERS IN A DEVICE FOR INTERFACING COMMUNICATIONS EQUIPMENT TO A TELEPHONE LINE

[75] Inventors: Chichong Lee, Madison; David M. Krum; Dong Ouyang, both of Huntsville, all of Ala.

[73] Assignee: Motorola, Inc., Schaumburg, Ill.

[21] Appl. No.: 08/789,043

[22] Filed: Jan. 28, 1997

[51] Int. Cl.⁶ .............................. H04J 3/14; H04M 11/00
[52] U.S. Cl. .......................... 370/251; 370/420; 370/524; 379/93.06; 379/243
[58] Field of Search .................................... 370/249, 250, 370/251, 252, 360, 384, 385, 401, 420, 522, 524; 379/93.01, 93.05, 93.06, 93.07, 93.23, 243, 244, 245, 246

[56] References Cited

U.S. PATENT DOCUMENTS

| | | | |
|---|---|---|---|
| 5,012,466 | 4/1991 | Buhrke et al. | 370/524 |
| 5,315,595 | 5/1994 | Allouis et al. | 370/524 |
| 5,317,630 | 5/1994 | Feinberg et al. | 370/522 |

OTHER PUBLICATIONS

Screen Printout of U.S. Robotics Sportster ISDN 128K Terminal Adapter diagnostic message—Isdnhelp1.txt, printed Jan. 23, 1997.

Screen Printout of U.S. Robotics Sportster ISDN 128K Terminal Adapter diagnostic message—Isdnhelp2.txt, printed Jan. 23, 1997.

Screen Printout of U.S. Robotics Sportster ISDN 128K Terminal Adapter diagnostic message—Isdnhelp3.txt, printed Jan. 23, 1997.

*Primary Examiner*—Alpus H. Hsu
*Attorney, Agent, or Firm*—John Powell; Kirk W. Dailey; Joanne N. Pappas

[57] ABSTRACT

An apparatus for and method of checking the validity of one or more directory numbers in a device for interfacing communications equipment to a digital telephone line, wherein the device is capable of accessing at least two channels on the digital telephone line, each channel having a directory number associated therewith, including: instructing the device to establish a plurality of protocol layers; initiating a call from the device over a first channel of the digital telephone line to the device over a second channel of the digital telephone line only if the plurality of protocol layers are established; and determining if the call is received by the device over the second channel to check the validity of the directory number associated with the second channel.

24 Claims, 4 Drawing Sheets

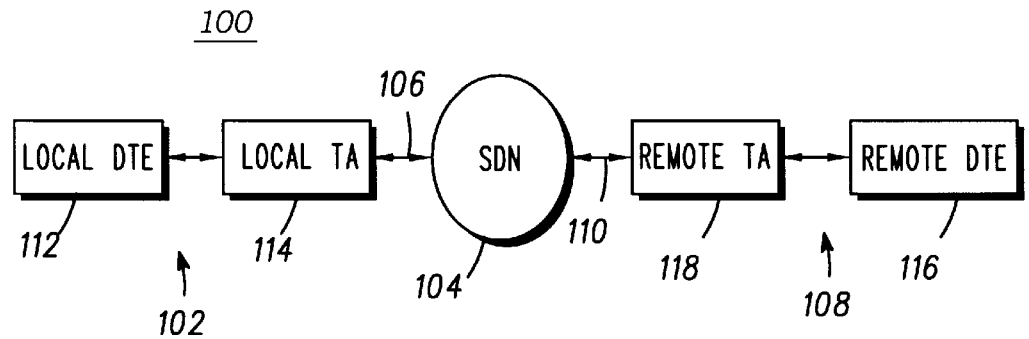
FIG. 1 — PRIOR ART —
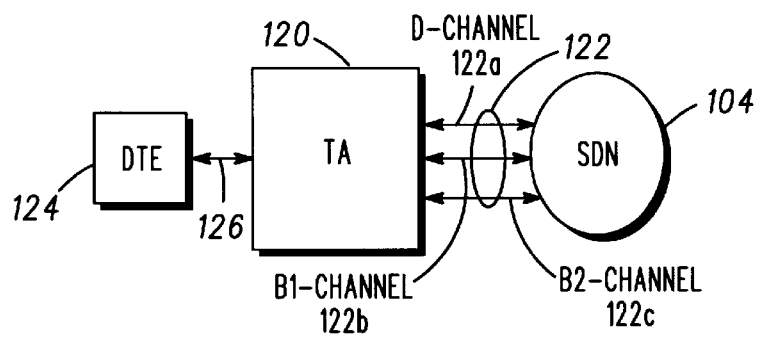
FIG. 2
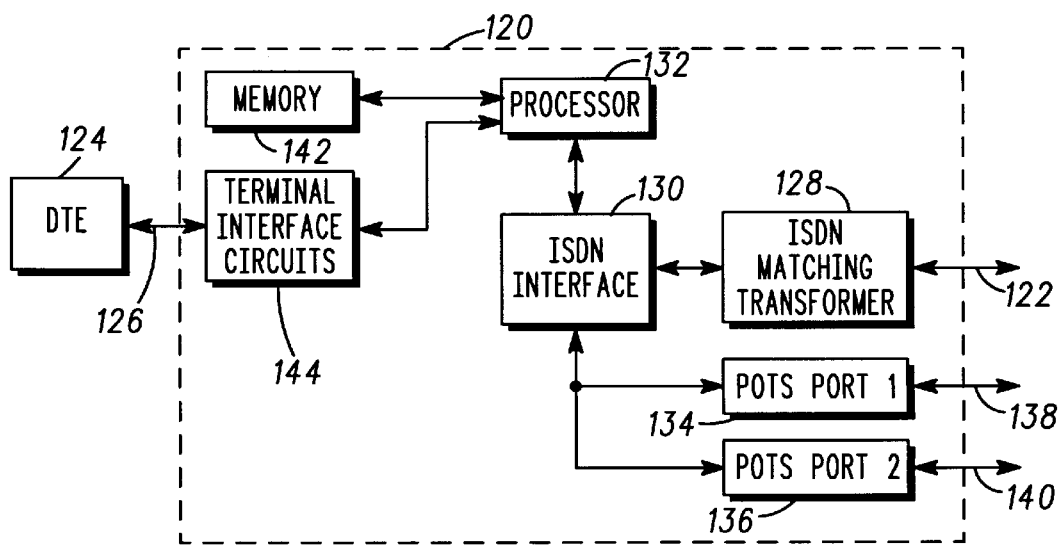
FIG. 3

APPARATUS FOR AND METHOD OF CHECKING THE VALIDITY OF DIRECTORY NUMBERS IN A DEVICE FOR INTERFACING COMMUNICATIONS EQUIPMENT TO A TELEPHONE LINE

FIELD OF INVENTION

This invention relates generally to an apparatus for and method of checking the validity of directory numbers in a device for interfacing communications equipment to a telephone line and more specifically to such an apparatus and method for checking the validity of directory numbers for an ISDN terminal adapter as well as other configuration parameters.

BACKGROUND OF INVENTION

ISDN (Integrated Services Digital Network) is an all digital communications network. The basic rate ISDN line is a user-to-network interface consisting of three communications channels. There are two B channels for voice, data and facsimiles and one D channel for signaling. Devices known as terminal adapters enable the user to interface various digital and analog communications equipment, such as computers, phones, facsimile machines, and analog modems to the ISDN line.

The two B channels, data channels, have different telephone numbers or directory numbers. Each channel is assigned a directory number by the local telephone company and the numbers are programmed into the terminal adapter when the adapter is installed and configured. Accordingly, the terminal adapter is capable of independently placing and receiving calls over both of the B channels.

Configuration also involves setting other parameters, such as the switch type, the switch version, the terminal endpoint identifiers (TEIs) and the service profile identifiers (SPIDs) in addition to the directory numbers. After the configuration parameters are set, the terminal adapter attempts to make a connection to the ISDN line by establishing several protocol layers. However, the directory numbers are not involved in those protocol layers and if the terminal adapter has stored therein an incorrect directory number associated with a channel, it will still be able to establish the basic protocol layers and place outgoing calls on the channel, yet it will not be able to receive incoming calls on the channel.

With most terminal adapters, if a wrong directory number is programmed into the terminal adapter during configuration, this will not become apparent until the user is unable to receive a call to the terminal adapter over the channel with the incorrect directory number. Even then it is unlikely that the user will determine that the incorrect directory number is causing the problem, especially when the user has correctly entered the wrong directory number supplied by the telephone company. Generally, the user will have to contact the terminal adapter manufacturer who will then determine the cause of the problem and refer the user to the telephone company to obtain the proper directory number.

One terminal adapter, the U.S. Robotics Sportster ISDN 128K terminal adapter, performs a "self call" test after configuration. With this test the terminal adapter attempts to place a call from one channel of the terminal adapter and receive that call on the other channel of the terminal adapter. If the call is not received, the terminal adapter indicates to the user that the terminal adapter appears to be connected to the ISDN network, and that the failed call may be due to one or more of a number of problems. The problems specified by the terminal adapter are that the ISDN drivers may be locked in a bad state, that the telephone company settings are incorrect (i.e. wrong switch type, phone number(s), SPID(s), or local access number), that the current dialing location information is incorrect or that the ISDN line is only provisioned for a single data channel. This terminal adapter provides only general information to the user as to why the self call test could possibly have failed. It does not specifically inform the user when the directory numbers are invalid and therefore it is not a very useful diagnostic tool.

Thus, there exists a need for an apparatus for and method of specifically checking the validity of directory numbers for a device for interfacing communications equipment to a telephone line, such as an ISDN terminal adapter and such an apparatus for and method of clearly indicating to the user the validity or invalidity of such directory numbers.

BRIEF DESCRIPTION OF THE DRAWINGS

FIG. 1 is a schematic block diagram of a typical ISDN network connection;

FIG. 2 is a schematic block diagram of a terminal adapter according to this invention interconnected to a switched digital network and a DTE;

FIG. 3 is a more detailed schematic block diagram of the terminal adapter of FIG. 2;

DETAILED DESCRIPTION OF THE PREFERRED EMBODIMENT

Figure 4A:
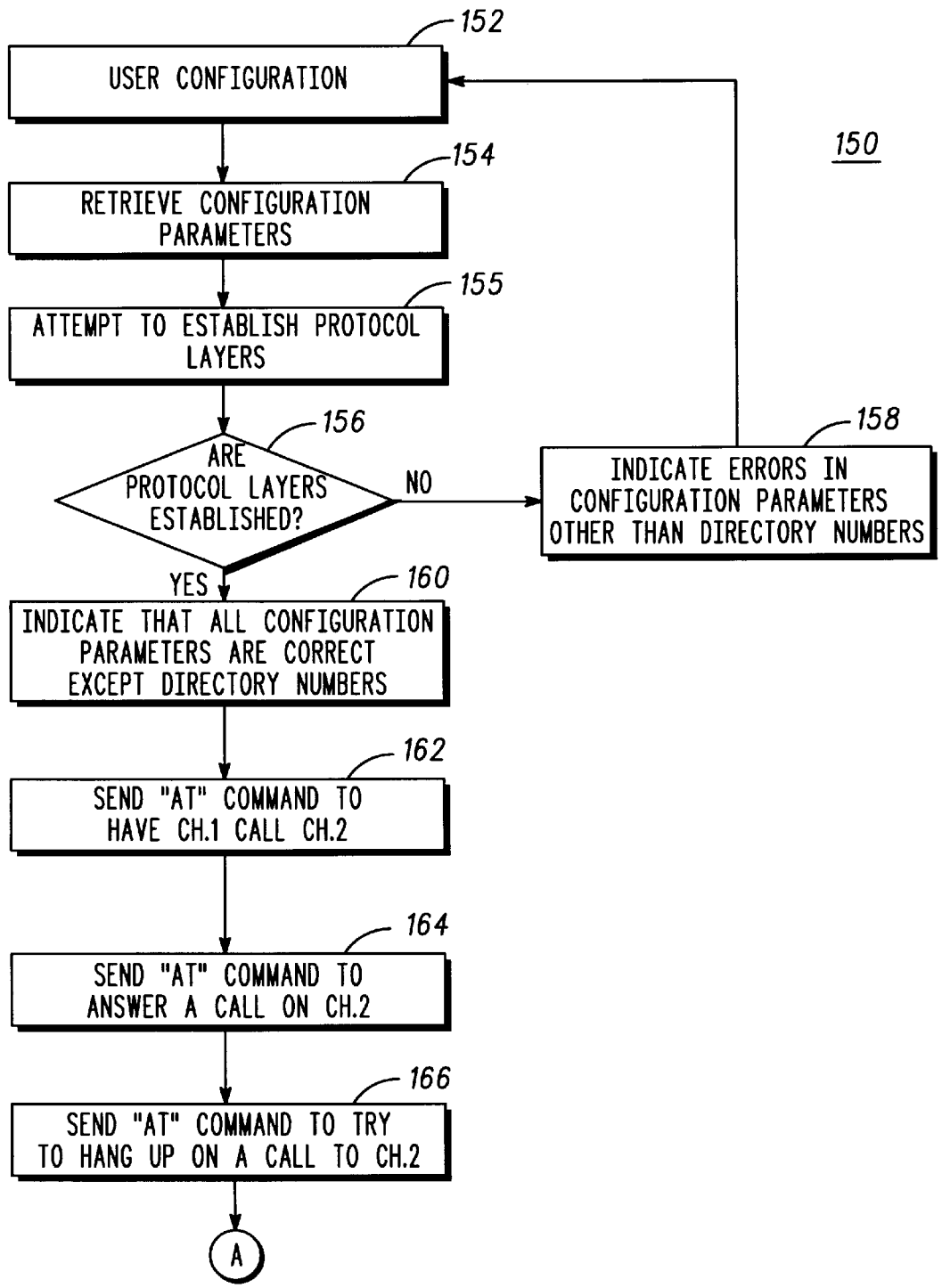
FIGS. 4A and 4B depict a flow diagram illustrating the logic used to implement the present invention.

There is shown in FIG. 1 a typical ISDN network connection 100 that includes a local site 102 interconnected to switched digital network (SDN) 104 by means of ISDN line 106 which, in this example, is a basic rate ISDN line consisting of a pair of telephone wires (a two wire service). There is also a remote site 108 interconnected to SDN 104 by means of ISDN line 110 (also a basic rate ISDN line). Local site 102 includes local data terminal equipment (DTE) 112, such as a personal computer, and a local terminal adapter 114 which interfaces local DTE 112 to ISDN line 106. Remote site 108 includes remote data terminal equipment (DTE) 116, such as another personal computer, and a remote terminal adapter 118 which interfaces remote DTE 116 to ISDN line 110.

As is known in the art, the ISDN connection between DTE 112 and DTE 116 enables, among other things, the high speed digital transfer of data between the two DTEs, as well as voice and facsimile with the proper equipment connected to the terminal adapters. However, before the terminal adapters can transmit and receive data, voice and facsimiles, the terminal adapters must be installed at the local site 102 and the remote site 108 and configured.

As described above, both channels of ISDN lines 106 and 110 are assigned directory numbers (telephone numbers) by the local telephone company which are programmed into the terminal adapters when the adapters are installed and configured. Configuration also involves setting other parameters, such as switch type, switch version, service profile identifiers (SPIDs) and terminal endpoint identifiers (TEIs). There are ways, as described below, to determine if the switch type, switch version, SPIDs and TEIs have been properly set. After configuration, the terminal adapter checks to see if certain protocol layers have been established. If the protocol layers have been established, then it is known that these parameters have been set properly. If the protocol layers have not been established, then one or more of these parameters have not been set properly. However, the directory numbers are not involved in the protocol layer establishment and if the terminal adapter is configured with an invalid directory number assigned to one of its channels, it will still be able to establish the basic protocol layers and place outgoing calls, yet it will not be able to receive incoming calls on the channel with the invalid directory number.

With the present invention, the configuration parameters other than the directory numbers are initially checked for validity. Once it is verified that they are valid, the directory numbers associated with each of the channels are separately and specifically checked to determine if they are correct. If they are correct, this information is communicated to the user or the user is simply informed that configuration is complete and that the terminal adapter is operational. If a directory number is not valid, then this information is communicated to the user. Thus, the user is specifically informed when a directory number is invalid; a problem that will prevent the terminal adapter from receiving calls on the channel with the incorrect directory number.

In FIG. 2, a terminal adapter 120 according to the present invention is shown interconnected to SDN 104 by means of ISDN line 122 (a two wire service) in the same manner that terminal adapters 114 and 118, FIG. 1, are interconnected to SDN 104. ISDN line 122 includes channels 122a–c. Channel 122a is the D or Delta channel which carries the control signaling at a data rate of 16 kilobits per second. The control signaling includes, among other things, the signaling required to place and receive calls on the data channels. Channels 122b and 122c are the two B (Bearer) or data channels which can each be used to carry voice or to carry data at a rate of 64 kilobits per second. Terminal adapter 120 is also interconnected to DTE 124 over line 126 enabling the DTE to transfer and receive data over SDN 104.

A block diagram of a typical hardware configuration of terminal adapter 120 is shown in FIG. 3. ISDN matching transformer 128 provides coupling between ISDN line 122 and ISDN interface circuit 130, which may be a Motorola MC145572, for example. ISDN interface circuit 130 is also coupled to processor 132, which may be a Motorola MC68302, for example, and to a first POTS (plain old telephone service) port 134 and a second POTS port 136. POTS ports 134 and 136 enable terminal adapter 120 to be interconnected over lines 138 and 140, respectively, with analog communications equipment, such as analog modems, facsimile machines and analog phones.

Processor 132 is coupled to memory 142 which stores information for terminal adapter 120, such as op code for processor 132, configuration details, such as directory numbers and other configuration parameters and, as described below, it may store firmware for implementing the directory number validity check according to the present invention. Processor 132 is also coupled to terminal interface circuits 144 which provide a connection between DTE 124 and processor 132.

Figure 4B:
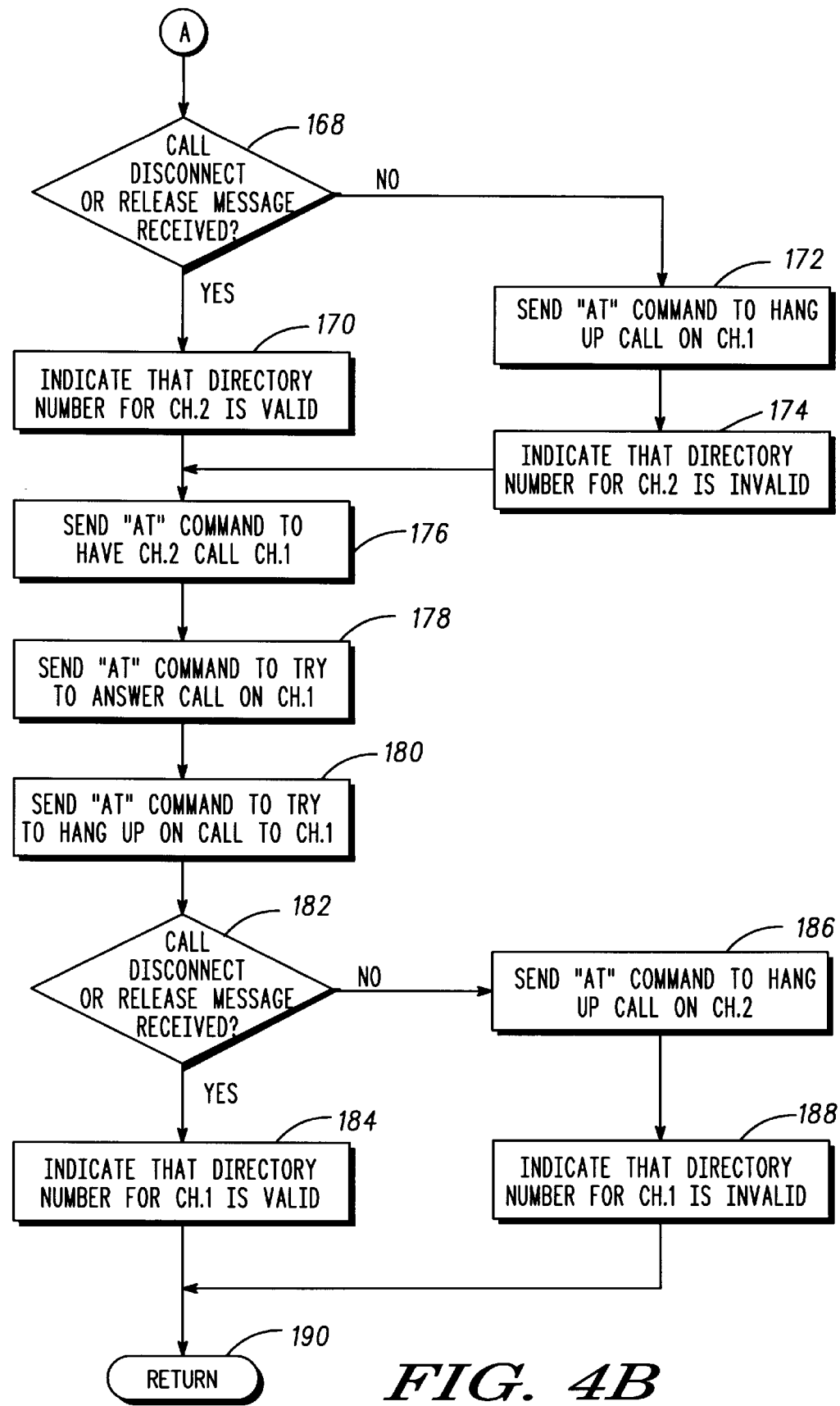

The present invention may be implemented in the terminal adapter by storing in memory 142, FIG. 3, the instructions to carry out the logic set forth in flow diagram 150, FIGS. 4A and 4B, (and flow diagram 200, FIG.5) or it may be implemented in the DTE 124, FIG. 3, by locating the instructions in an application program in DTE 124. When the invention is implemented in the terminal adapter, an AT command from DTE 124 or an LCD menu option on terminal adapter 120 or some other interface may be used to initiate the execution of instructions from memory 142 by processor 132. Or, when the invention is implemented in the DTE 124, the instructions originate in the DTE 124 and are executed by processor 132.

Flow diagram 150 begins at step 152 when the user is inputs the configuration parameters. At step 154, the configuration parameters are retrieved and stored in memory 142 of terminal adapter 120, FIG. 3. In step 155 the terminal adapter attempts to establish several protocol layers and in step 156 it is determined if the protocol layers are established. The protocol layers include: Layer 1, the physical layer; Layer 2, the link layer; and Layer 3, the network layer. These protocol layers and their establishment are discussed in the CCITT recommendations I.430, Q.921 and Q.931, respectively. If one or more of the protocol layers are not established, then in step 158 an error in the configuration of the one or more of the configuration parameters other than the directory numbers is indicated and a return to step 154 is undertaken. The evaluation of the protocol layers and the indication of errors in the configuration parameters of steps 156 and 158 are depicted in more detail in FIG. 5 discussed below.

If the protocol layers are determined to be established in step 156, then terminal adapter 120 indicates that all of the configuration parameters with the exception of the directory numbers have been verified and are valid in step 160. A check of the validity of the directory numbers is then undertaken.

To do this, terminal adapter 120 attempts to place a call from the first data channel to the second data channel and vice versa and then determines if the calls were received. If the calls were received this indicates the directory numbers associated with the channels are valid and if the calls were not received, the directory numbers are invalid. This invention is only applicable to terminal adapters that are capable of placing calls from one of the terminal adapter's channels and receiving those calls on the other channel of the terminal adapter.

This may be accomplished as follows. At step 162, an AT command is sent to processor 132 to have channel 1, e.g. 122b, FIG. 2, place a call to the directory number of channel 2, e.g. 122c, FIG. 2, which directory number is stored in memory 142, FIG. 3. At step 164 an AT command is sent to processor 132 to try to answer a call on channel 2. At step 166 an AT command is sent to processor 132 to try to hang up a call on channel 2. In step 168 it is determined if a call disconnect or release message was received with regard to channel 2. If such a message was received, the indicates that the call from channel 1 was received by channel 2 and therefore the directory number for channel 2 is valid. This is indicated at step 170. It should be noted that other means for determining if a call was received can be used. If the call disconnect or release message was not received, this indicates that channel 1 did not call channel 2 because the wrong directory number was input into the terminal adapter. Therefore, at step 172 an AT command is sent to processor 132 to hang up the call placed on channel 1 and at step 174 it is indicated that the directory number for channel 2 is invalid.

The same evaluation is carried out with regard to channel 1. At step 176, an AT command is sent to processor 132 to have channel 2 place a call to the directory number of channel 1, which directory number is stored in memory 142, FIG. 3. At step 178 an AT command is sent to processor 132 to try to answer a call on channel 1. At step 180 an AT command is sent to processor 132 to try to hang up a call on channel 1. In step 182 it is determined if a call disconnect or release message was received with regard to channel 1. If such a message was received, this indicates that the call from channel 2 was received by channel 1 and therefore the directory number for channel 1 is valid. This is indicated at step 184. If the call disconnect or release message was not received this indicates that channel 2 did not call channel 1 because the wrong directory number was input into the terminal adapter for channel 1. Therefore, at step 186 an AT command is sent to processor 132 to hang up the call placed on channel 2 and at step 188 it is indicated that the directory number for channel 1 is invalid. The evaluation then terminates at step 190.

It should be noted that the process of placing and receiving calls in an ISDN terminal adapter is described in CCITT recommendation Q.931. Moreover, that process applies to the present case where a terminal adapter calls itself by placing a call from one of its channels to the other.

Figure 5:
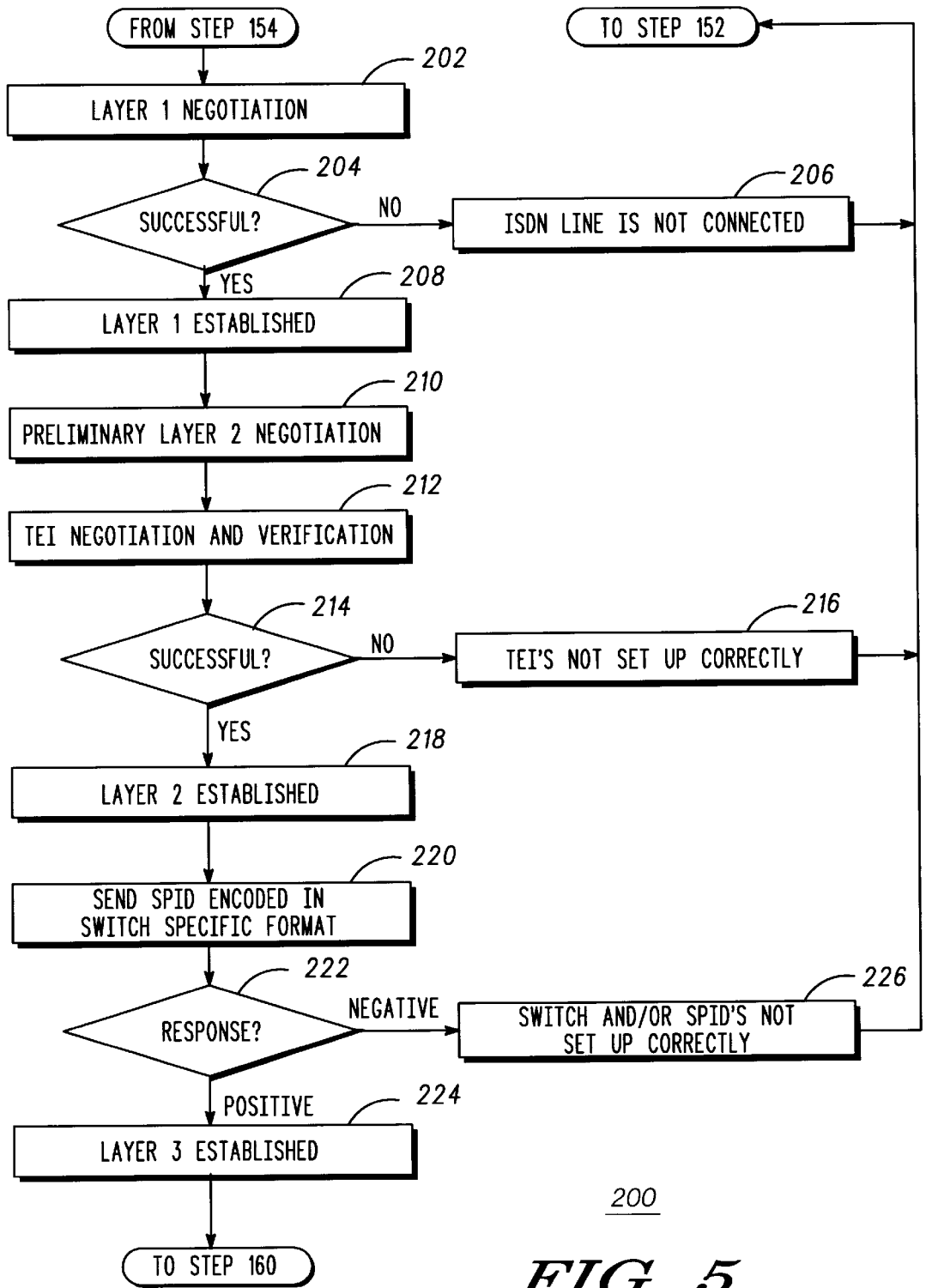
FIG. 5 is a flow diagram providing further detail of how the protocol layer evaluation and error indication steps of the flow diagram of FIGS. 4A and 4B are implemented.

Flow diagram 200, FIG. 5, provides further detail as to how it is determined if the protocol layers are established in step 156 and how errors in configuration parameters are indicated in step 158 of FIG. 4. In the first step, step 202, Layer 1 negotiation is performed as set forth in CCITT I.430. At step 204 it is determined if the negotiation was successful. If it was not successful, at step 206 it is indicated that the ISDN line is not connected and the evaluation proceeds to step 152 of flow diagram 150, FIG. 4. If Layer 1 negotiation was successful, at step 208 it is indicated that Layer 1 is established. At step 210 preliminary Layer 2 negotiation is performed and at step 212 TEI negotiation and verification is performed according to CCITT Q.921. It is determined If these negotiations are successful at step 214. If they are not, at step 216 it is indicated that the TEIs are configured incorrectly and the evaluation continues by returning to step 152 for user configuration. If the negotiations are successful, at step 218 it is indicated that Layer 2 is established. Then, at step 220 the SPID(s) encoded in switch specific format is/are sent to the switch. At step 222 the switch response is evaluated. If the switch was able to interpret the SPID encoded information, then the SPID(s) is/are correct and at step 224 it is indicated that Layer 3 is established and the evaluation proceeds to step 160, FIG. 4. If the response from the switch at step 222 reveals that the switch could not interpret the SPID encoded information, then at step 226 it is indicated that the switch and or SPIDs are configured incorrectly and the evaluation proceeds to step 152, FIG. 4, for user configuration.

While this invention has been described with regard to terminal adapters which interface communications equipment and basic rate ISDN lines, it is also applicable to PRI line interface units which interface communications equipment and primary rate ISDN lines. Primary rate ISDN line have 23 B channels and 1 D channel. This invention could be used to check the validity of the directory numbers associated with the B channels stored in the PRI line interface unit.

What is claimed is:

1. A method of checking the validity of one or more directory numbers in a device for interfacing communications equipment to a digital telephone line, wherein the device is capable of accessing at least two channels on the digital telephone line, each channel having a directory number associated therewith, the method comprising:

instructing the device to establish a plurality of protocol layers;

initiating a call from the device over a first channel of the digital telephone line to the device over a second channel of the digital telephone line only if the plurality of protocol layers are established; and determining if the call is received by the device over the second channel to check the validity of the directory number associated with the second channel.

2. The method of claim 1 further including the step of indicating that at least one configuration parameter, other than the directory numbers, is not valid when the plurality of protocol layers are not established.

3. The method of claim 1 further including the step of indicating that all configuration parameters other than the directory numbers are valid when the plurality of protocol layers are established.

4. The method of claim 1 further including initiating a call from the device over the second channel of the digital telephone line to the device over the first channel of the digital telephone line only if the plurality of protocol layers are established; and determining if the call was received by the device over the first channel to check the validity of the directory number associated with the first channel.

5. The method of claim 1 further including initiating a call to the device over each of the channels from the device over different channels and determining if the calls were received by each of the channels to check the validity of the directory numbers associated with the channels.

6. The method of claim 1 further including indicating that the directory number associated with the second channel is invalid when the call over the second channel is not received.

7. The method of claim 1 further including indicating that the directory number associated with the second channel is valid when the call over the second channel is received.

8. The method of claim 4 further including indicating that the directory number associated with the first channel is invalid when the call over the first channel is not received.

9. The method of claim 4 further including indicating that the directory number associated with the first channel is valid when the call over the first channel is received.

10. The method of claim 5 further including indicating that the directory number associated with a channel on which a call is not received is invalid.

11. The method of claim 5 further including indicating that the directory number associated with a channel on which a call is received is valid.

12. A method of checking the validity of the directory numbers in a terminal adapter adapted for connection to a digital telephone line having two data channels, wherein the first channel has a first directory number and the second channel has a second directory number, the method comprising:

instructing the terminal adapter to establish a plurality of protocol layers;

initiating a first call from the terminal adapter over the first channel of the digital telephone line to the terminal adapter over the second channel of the digital telephone line only if the plurality of protocol layers are established;

determining if the first call is received by the terminal adapter over the second channel;

indicating that the second directory number is invalid when the first call is not received by the terminal adapter over the second channel;

initiating a second call from the terminal adapter over the second channel to the terminal adapter over the first channel only if the plurality of protocol layers are established;

determining if the second call is received by the terminal adapter over the first channel; and indicating that the first directory number is invalid when the second call is not received by the terminal adapter over the first channel.

13. In a device for interfacing communications equipment to a digital telephone line, wherein the device is capable of accessing at least two channels on the digital telephone line, each channel having a directory number associated therewith, an apparatus for checking the validity of the directory numbers, comprising:

means for instructing the device to establish a plurality of protocol layers;

means for initiating a call from the device over a first channel of the digital telephone line to the device over a second channel of the digital telephone line only if the plurality of protocol layers are established; and means for determining if the call is received by the device over the second channel to check the validity of the directory number associated with the second channel.

14. The apparatus of claim 13 further including means for indicating that at least one of the configuration parameters other than the directory numbers is not valid when the plurality of protocol layers are not established.

15. The apparatus of claim 13 further including means for indicating that all of the configuration parameters other than the directory numbers are valid when the plurality of protocol layers are established.

16. The apparatus of claim 13 further including means for initiating a call from the device over the second channel of the digital telephone line to the device over the first channel of the digital telephone line only if the plurality of protocol layers are established; and means for determining if the call was received by the device over the first channel to check the validity of the directory number associated with the first channel.

17. The apparatus of claim 13 further including means for initiating a call to the device over each of the channels from the device over different channels and means for determining if the calls were received by each of the channels to check the validity of the directory numbers associated with the channels.

18. The apparatus of claim 13 further including means for indicating that the directory number associated with the second channel is invalid when the call over the second channel is not received.

19. The apparatus of claim 13 further including means for indicating that the directory number associated with the second channel is valid when the call over the second channel is received.

20. The apparatus of claim 16 further including means for indicating that the directory number associated with the first channel is invalid when the call over the first channel is not received.

21. The apparatus of claim 16 further including means for indicating that the directory number associated with the first channel is valid when the call over the first channel is received.

22. The apparatus of claim 17 further including means for indicating that the directory number associated with a channel on which a call is not received is invalid.

23. The apparatus of claim 17 further including means for indicating that the directory number associated with a channel on which a call is received is valid.

24. In a terminal adapter adapted for connection to a digital telephone line having two data channels, wherein the first channel has a first directory number, and the second channel has a second directory number, an apparatus for checking the validity of the first and second directory numbers, comprising:

means for instructing the terminal adapter to establish a plurality of protocol layers;

means for initiating a first call from the terminal adapter over the first channel of the digital telephone line to the terminal adapter over the second channel of the digital telephone line only if the plurality of protocol layers are established;

means for determining if the first call is received by the terminal adapter over the second channel;

means for indicating that the second directory number is invalid when the first call is not received by the terminal adapter over the second channel;

means for initiating a second call from the terminal adapter over the second channel to the terminal adapter over the first channel only if the plurality of protocol layers are established;

means for determining if the second call is received by the terminal adapter over the first channel; and means for indicating that the first directory number is invalid when the second call is not received by the terminal adapter over the first channel.

* * * * *